Patented Aug. 7, 1951

2,563,743

UNITED STATES PATENT OFFICE 2,563,743

1-PROLYL-1-CYSTEINYL-1-TYROSINE

Albert Adolphe Plentl, New York, N. Y., assignor to Ralph L. Evans, Bay Shore, N. Y.

No Drawing. Application November 7, 1947, Serial No. 784,765

1 Claim. (Cl. 260—112)

The present invention relates to starting nuclei for the preparation of polypeptide chains and in particular to new and useful peptides resulting from the linkage of proline and cysteine.

Objects and advantages of the invention will be set forth in part hereinafter and in part will be obvious herefrom, or may be learned by practice with the invention, the same being realized and attained by means of the processes, steps, and combinations pointed out in the appended claim.

The invention consists in the novel steps, processes, combinations and improvements herein shown and described.

From the work which I have done it appears that proline, cysteine and tyrosine are some of the essential amino acids in certain physiologically active peptides secreted by the posterior lobe of the pituitary gland.

It is an object of the present invention to provide starting nuclei for building of polypeptide chains, said nuclei being the free dipeptide prolyl-cysteine, and also forms of this dipeptide in which one or more of the reactive groups not in peptide linkage are blocked with easily removable radicals. A further object is to provide similar starting nuclei in which a blocked or unblocked tyrosine radical is attached to the cysteine portion of the chain.

An example of preparation of embodiments of this invention is as follows:

Carbobenzoxy-1-prolyl-(S-benzyl)-1-cysteine ethyl ester 40 g. of S-benzylcysteine ethyl ester HCl are dissolved in 200 cc. water cooled in ice, and sufficient 20% $Na_2CO_3$ added to liberate the free base. The product separates as a heavy oil which is extracted with 3×150 cc. portions of ethyl acetate. The combined ethyl acetate extracts are dried with anhydrous $MgSO_4$, filtered through folded filter paper and the filtrate concentrated to about 100 cc.

The solution is transferred to a 500 cc. round bottom flask provided with a mechanical stirrer, separatory funnel and a $CaCl_2$ tube. 200 cc. anhydrous pyridine are now added and the mixture cooled in ice. With rapid stirring and continued cooling a solution of 18.1 g. carbobenzoxy prolyl chloride in 200 cc. absolute ether is added drop by drop over a period not exceeding 15 minutes. Stirring is then continued for another hour at 0° and the mixture allowed to stand at room temperature for another hour.

The reaction mixture is then poured into 500 cc. 5% HCl and the ether-ethyl acetate layer separated, washed with water and sodium bicarbonate. This is dried over $MgSO_4$ filtered and taken to dryness under reduced pressure. The residue crystallizes instantly. After recrystallization from dilute alcohol and ether-petroleum ether mixtures the compound melts at 75–77° C. 12.3 g. of the pure compound are obtained.

$C_{25}H_{30}O_5N_2S$ (470)—

| | | | | |
|---|---|---|---|---|
| Calc.: C, 63.83 | H, 6.38 | N, 5.96 | S, 6.81 | |
| Found: 63.74 | 6.34 | 6.15 | 6.59 | |
| 63.76 | 6.28 | 6.05 | 6.51 | |

Carbobenzoxy-1-prolyl-S-benzyl-1-cysteine hydrazide 12.0 g. of carbobenzoxy prolyl-S-(benzyl)-cysteine ethyl ester are dissolved in 200 cc. of absolute ethyl alcohol. Slight warming may be necessary to bring all of it into solution. To the clear solution are added 25 cc. of hydrazine hydrate and the mixture is allowed to stand in the icebox for 72 hours. At the end of this time the product begins to crystallize, and after an additional 24 hours, most of the product will have separated. The crystals are filtered off and recrystallized from dilute ethyl alcohol M. P. 139–140°. 4 or 5 recrystallizations may be necessary before the correct melting point can be obtained. 8.2 g. of the pure product are obtained.

$C_{23}H_{28}O_4N_4S$ (456)—

Calc.: N, 12.28%
Found: 12.51
12.25

Carbobenzoxy-1-prolyl-1-(S-benzyl)-1-cysteinyl-1-tyrosine ethyl ester 8.0 g. of carbobenzoxy prolyl-S-benzyl-cysteinyl hydrazide are dissolved in 50 cc. acetic acid containing about 40% glacial acetic acid. The solution is filtered through coarse paper and the filtrate cooled in ice. To this solution are added 1.20 g. (calculated amount) of sodium nitrite dissolved in about 3 cc. of water. The azide precipitates as an oil and is extracted with cold ether. A compound of unidentified nature precipitates between the ether and the water layer and is removed by filtration. The ethereal solution of the azide is dried with magnesium sulfate and after removal of the drying agent, this solution is added to 3.63 g. of tyrosine ethyl ester M. P. 105° C. dissolved in 50 cc. anhydrous ethyl acetate. After standing at room temperature for 24 hours the crystalline product which had formed is removed by filtration and dried in open air. 4.40 g. of the crude product is obtained. The compound can be recrystallized from ether-ethyl acetate or acetone-water mixtures. From the latter solvent mixture the compound precipitates in gelatinous form and is difficult to recrystallize, but the purification is much more efficient than from ether-ethyl acetate mixtures. The pure compound melts at 155–156° C.

Calculated for $C_{34}H_{39}O_7N_3S$—

Calc.: C, 64.4   H, 6.15   N, 6.63   S, 5.06
Found: 64.2   6.57   6.95   4.89
       63.98   6.41   7.12   4.79

Carbobenzoxy prolyl-(S-benzyl)-1-cysteinyl-1-tyrosine 2.0 g. of the tripeptide ester M. P. 155–156° are finely ground in a mortar and shaken with an excess of 2N NaOH at room temperature until most of it had dissolved. The cloudy solution is extracted with ethyl acetate and the aqueous layer acidified with dilute hydrochloric or sulfuric acid. The free acid precipitates as an oil which crystallizes in the icebox after standing over night. After several recrystallizations from dilute ethyl alcohol the pure substance melts at 204° C. A total of 1.70 g. is obtained.

Calculated for $C_{32}H_{35}O_7N_3S$—

Calc.: C, 63.5   H, 5.78   N, 6.94   S, 5.28
Found: 63.9   5.98   7.10   5.07
       63.8   6.08   7.02   5.09

Mol. wt.—

Calc.: 605

Found: 620, 595, 631, 618

1-Prolyl-1-cysteinyl-1-tyrosine 40 cc. anhydrous liquid ammonia are collected in a 200 cc. 3 neck round bottom flask. The flask is cooled in Dry-Ice-acetone mixture and provided with an efficient stirrer, 1.20 g. of carbobenzoxy-1-prolyl-1-(S-benzyl)-cysteinyl-tyrosine is dissolved in the ammonia and 0.2 g. metallic sodium is added in small amounts. When a permanent blue color is obtained, 500 mgm. of ammonium sulfate is added, which decolorizes the solution almost immediately.

The stirrer is now removed and replaced by a gas inlet tube. Nitrogen (O. P.) is blown through the mixture in order to avoid oxidation by atmospheric oxygen and to help in the spontaneous evaporation of ammonia. After 24 hours of this treatment a small amount of white crystalline material remains in the flask with almost no residual ammonia. This residue is dissolved in 30 cc. of water and kept under vacuum at room temperature for 2 hours and brought to pH 3–5 with N $H_2SO_4$.

A suspension of freshly prepared $Cu_2O$ is then added in small amounts at a time. The suspension is stirred for 10 hours and then allowed to stand at room temperature for 24 hours. The amount of $Cu_2O$ used is so adjusted that a slight excess is present at the end of the procedure. The precipitate is centrifuged and washed four times with 10 cc. portions of water.

The washed copper salts are suspended in 100 cc. of water and hydrogen sulfide blown through this suspension for 45 minutes. The copper sulfides are then removed, preferably by filtration using filter cell, and the clear filtrate concentrated under reduced pressure. The pH of this solution is between 5 and 6. When the volume reaches less than 10 cc. a fine crystalline precipitate appears which increases in amount upon standing in the icebox. This material is recrystallized from water from which it precipitates in form of fine needles.

The substance is soluble in dilute acid and alkali and precipitates upon neutralization of its acid or alkaline solutions. The nitroprusside and Sullivan reactions are strongly positive, which indicates that the compound is in reduced form.

Calculated for $C_{17}H_{23}O_5N_3S.2H_2O$:

C, 48.9   H, 5.5   N, 10.05   S, 7.7   $H_2O$, 8.7

Found:

C, 49.29   H, 6.09   N, 10.13   S, 7.81   $H_2O$, 8.6
   49.06   6.20   10.34   7.68

The invention in its broader aspects is not limited to the specific processes and steps shown and described but departures may be made therefrom within the scope of the accompanying claim without departing from the principles of the invention and without sacrificing its chief advantage.

What is claimed is:

1-prolyl-1-cysteinyl-1-tyrosine.

ALBERT ADOLPHE PLENTL.

REFERENCES CITED

The following references are of record in the file of this patent:

Migliardi: Arch. Scienze Biol. (Italy), vol. 27, pp. 327–332 (1941).

Chem. Abstracts, vol. 39 (1945), page 932. Citing: Migliardi—Arch. Scienze Biol. (Italy), vol. 27: 327–332 (1941).

Chem. Abstracts, vol. 39 (1945), pages 3257–3258. Citing: Harrington et al.—Biochemical J., vol. 38: 417 to 428 (1944).

Harrington et al.: Biochem. J., vol. 38, pp. 417–428 (1944).